(12) United States Patent
Garcia et al.

(10) Patent No.: US 10,046,612 B1
(45) Date of Patent: Aug. 14, 2018

(54) HITCH NOISE PREVENTION DEVICE

(71) Applicants: Marco Garcia, Phoenix, AZ (US); Dan Hamby, Phoenix, AZ (US)

(72) Inventors: Marco Garcia, Phoenix, AZ (US); Dan Hamby, Phoenix, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 37 days.

(21) Appl. No.: 15/458,608

(22) Filed: Mar. 14, 2017

(51) Int. Cl.
  *B62D 1/24* (2006.01)
  *B60D 1/24* (2006.01)
  *B60D 1/60* (2006.01)
  *B60D 1/52* (2006.01)

(52) U.S. Cl.
  CPC .............. *B60D 1/241* (2013.01); *B60D 1/52* (2013.01); *B60D 1/60* (2013.01)

(58) Field of Classification Search
  CPC .................................. B60D 1/52; B60D 1/241
  See application file for complete search history.

(56) References Cited

U.S. PATENT DOCUMENTS

| | | |
|---|---|---|
| 2,067,451 A | 1/1937 | Jacob |
| 2,484,751 A | 10/1949 | Schultz |
| 5,593,172 A | 1/1997 | Breslin |
| 5,735,539 A | 4/1998 | Kravitz |
| 6,105,989 A | 8/2000 | Linger |
| 6,131,938 A | 10/2000 | Speer |
| 7,600,774 B1 | 10/2009 | Speer et al. |
| 7,726,681 B2 | 6/2010 | McKendry |

*Primary Examiner* — Kevin Hurley
(74) *Attorney, Agent, or Firm* — Richard E. Oney; Venjuris P.C.

(57) ABSTRACT

A receiver hitch includes a receiver with a rearward opening for receiving a forward end of a mount shank. The receiver has a side hole for receiving a hitch pin and a bottom hole for receiving a clamping bolt. The bottom hole is disposed forward of the side hole. When the mount shank is disposed in the receiver tube with the hitch pin inserted, tightening the clamping bolt urges a portion of the mount shank forward of the hitch pin upward into engagement with an upper interior surface of the receiver tube and also urges a portion of the mount shank rearward of the hitch pin into engagement with a lower interior surface of the receiver tube. in this configuration, movement of the mount shank within the receiver tube is reduced.

15 Claims, 4 Drawing Sheets

HITCH NOISE PREVENTION DEVICE

BACKGROUND

This invention relates generally to receiver hitch assemblies for coupling a towing vehicle to a trailer or other object to be towed. More specifically, the invention relates to a device that reduces the movement—and the resulting rattling noise—that occurs between a receiver and ball mount of such a hitch assembly during towing.

Typically, the receiver of a hitch assembly will include a receiver tube, and the ball mount will include a mount shank. In order for the mount shank to be easily inserted into the receiver tube, the receiver tube will be slightly larger than the mount shank. Due to this slight difference in size, the mount shank will have a tendency to move within the receiver tube and thereby produce a rattling noise. While the movement and resultant noise may not have a detrimental effect on the receiver hitch assembly, the rattling noise tends to be an annoyance.

Prior art devices and systems intended to address this noise issue suffer from a number of disadvantages. Among others, they have numerous components and as a result are complex to install and have correspondingly high manufacturing and maintenance costs. Therefore, there is a continuing need for an improved apparatus for preventing rattling in a receiver hitch assembly. It is an object of the present invention to provide such an apparatus.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in this specification and the appended claims.

SUMMARY

To achieve the foregoing objects, and in accordance with the purposes of the invention as embodied and broadly described in this document, there is provided a receiver hitch that includes a receiver tube having a forward end, a rearward end, a top wall, a bottom wall and two opposing side walls. The receiver rearward end includes an opening sized for receiving a forward end of a mount shank that has a side hole sized for receiving a hitch pin. A receiver side hole is disposed in the receiver tube side wall and also is sized for receiving the hitch pin. A receiver bottom hole is disposed in the bottom wall forward of the receiver side hole and is sized for receiving an upwardly projecting clamping member. The receiver tube also includes means for adjustably advancing the clamping member upward and retracting it downward. When the mount shank is disposed in the receiver tube with the hitch pin inserted, advancing the clamping member will urge a forward portion of the mount shank upward into engagement with an upper interior surface of the receiver tube and also will urge a rearward portion of the mount shank into engagement with a lower interior surface of the receiver tube. In this engaged position, movement of the mount shank within the receiver tube is reduced.

In some advantageous embodiments, the clamping member comprises a clamping bolt; and the means for adjustably advancing and retracting the clamping member comprises a threaded nut fixed to the bottom of the receiver tube and sized for receiving a mating threaded portion of the clamping bolt. The threaded nut can comprise a locking nut. In some embodiments, the means for advancing and retracting the clamping member comprises a threaded portion formed in the receiver bottom hole and sized for receiving a mating threaded portion of the clamping bolt. The clamping bolt can have a head configured for providing theft deterrence.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred embodiments given below, serve to explain the principles of the invention.

DESCRIPTION

Reference will now be made in more detail to presently preferred embodiments of the invention. While the invention is described more fully with reference to these examples, the invention in its broader aspects is not limited to the specific details, representative devices, and illustrative examples shown and described. Rather, the description which follows is to be understood as a broad, teaching disclosure directed to persons of ordinary skill in the appropriate arts, and not as limiting upon the invention.

It will be appreciated that terms such as "forward," "rearward," "upper," "inner," "outer," "vertical," "horizontal," "bottom," "below," "top," "side," "inwardly," "outwardly," "downwardly" and "lower" and other positionally descriptive terms used in this specification are used merely for ease of description and refer to the orientation of the referenced components as shown in the figures. It should be understood that any orientation of the components described herein is within the scope of the present invention.

Figure 1:
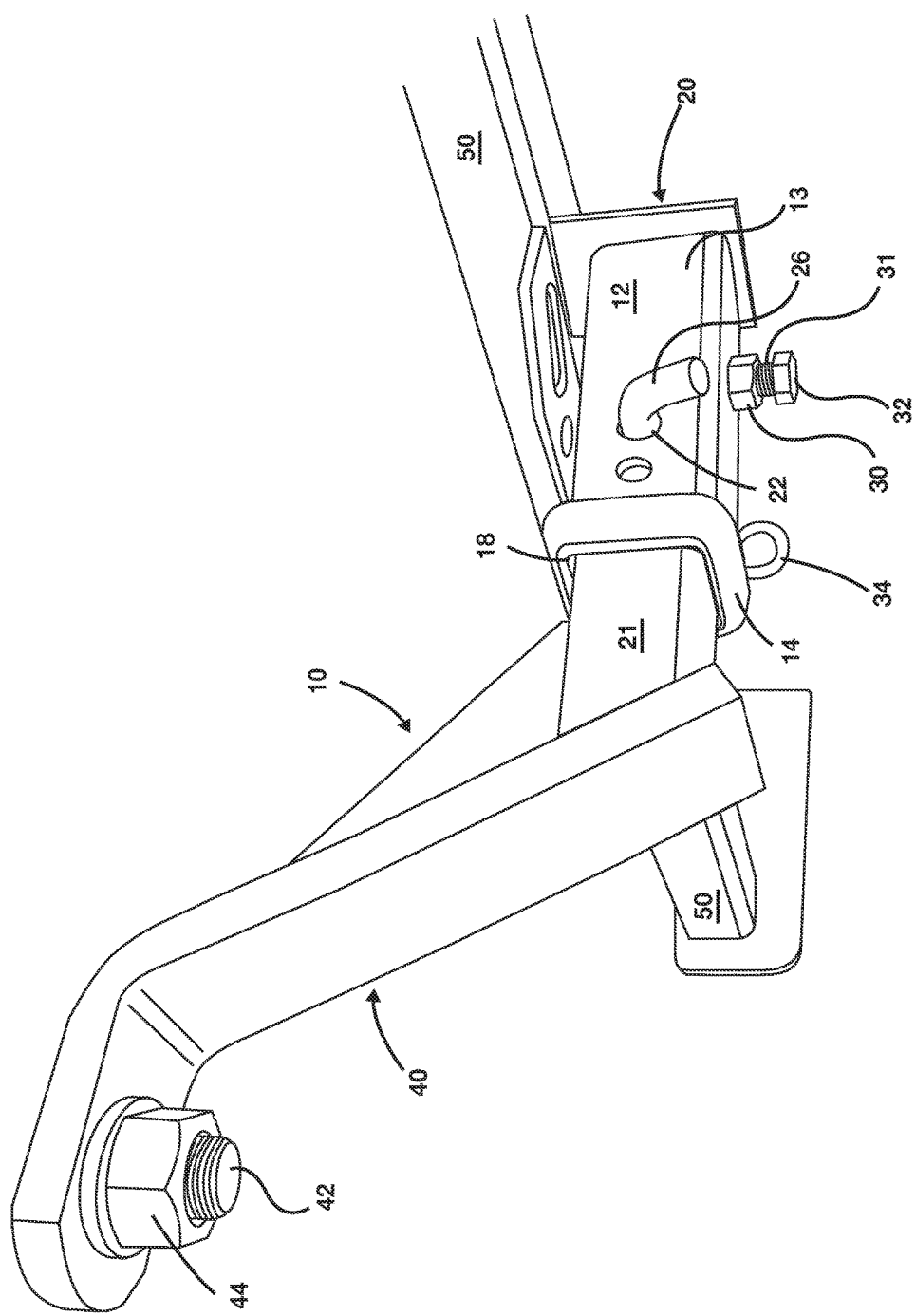
FIG. 1 is a bottom side perspective view of one embodiment of a receiver hitch assembly according to the present invention showing a ball mount inserted into a receiver mounted to a vehicle for towing.
Figure 2:
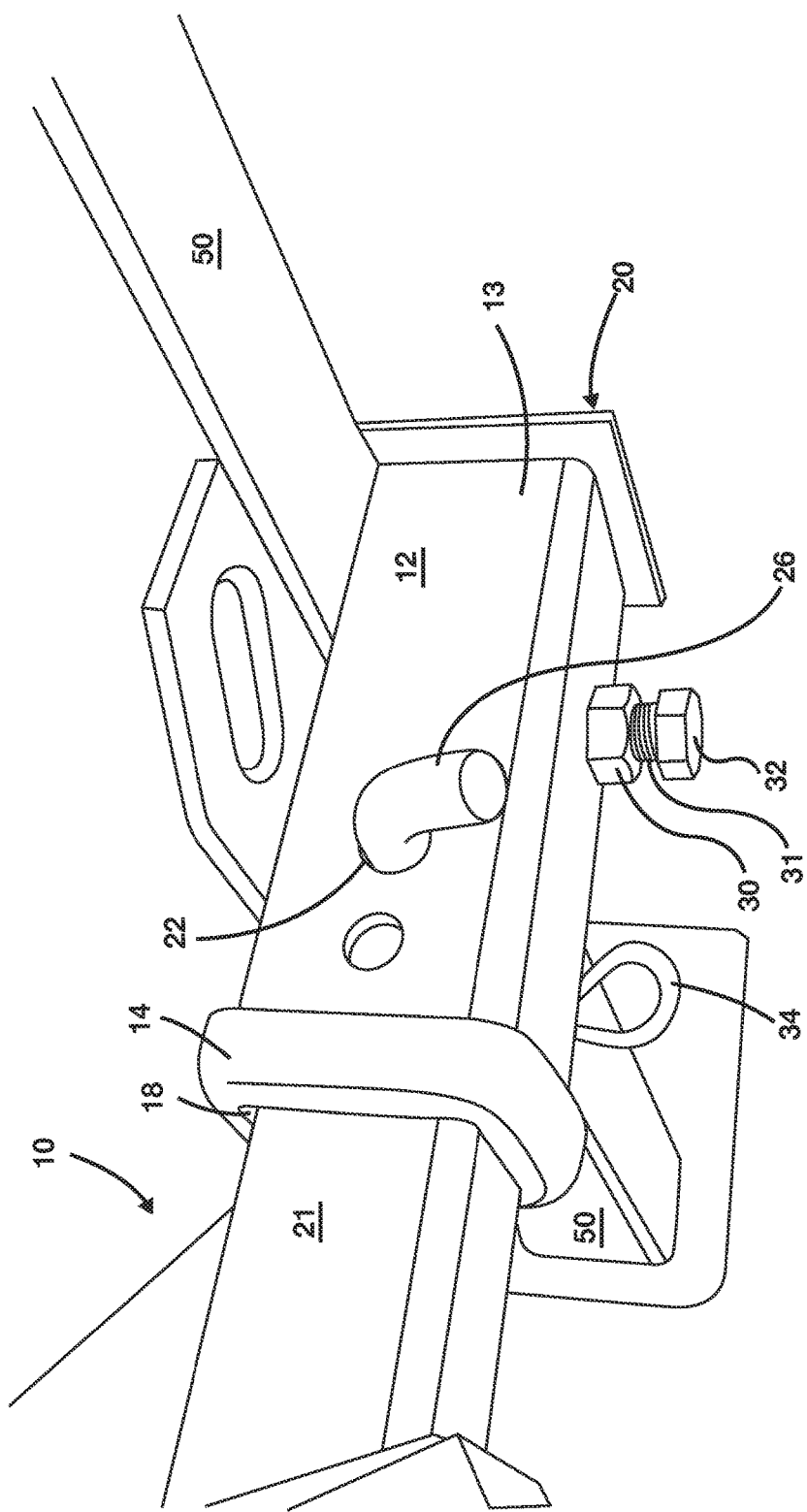
FIG. 2 is larger view of a portion of the receiver hitch assembly of FIG. 1, showing the mount shank and receiver tube.
Figure 3:
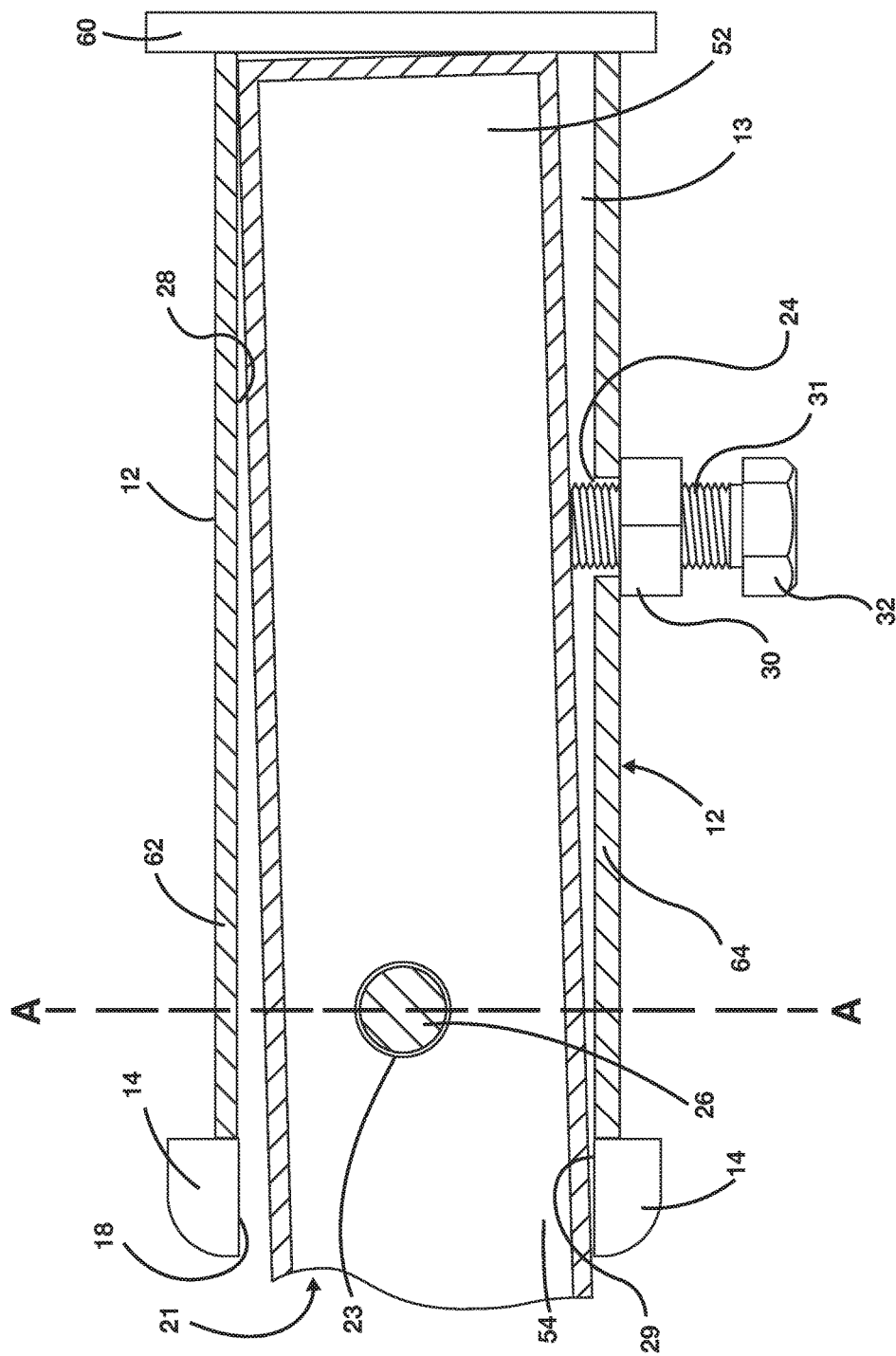
FIG. 3 is a side elevation partial cross-sectional view a portion of the receiver hitch assembly of FIG. 1 showing the clamping bolt pressing the mount shank into engagement with the upper and lower interior surfaces of the receiver tube.
Figure 4:
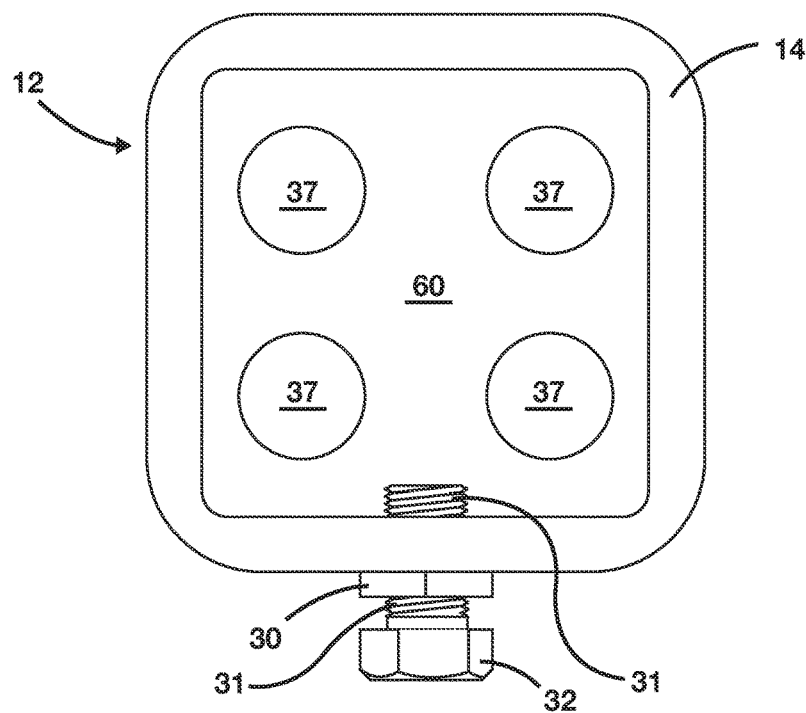
FIGS. 4 is a rear elevational view of the receiver tube of FIG. 1 showing the clamping bolt inserted into the receiver bottom hole.
Figure 5:
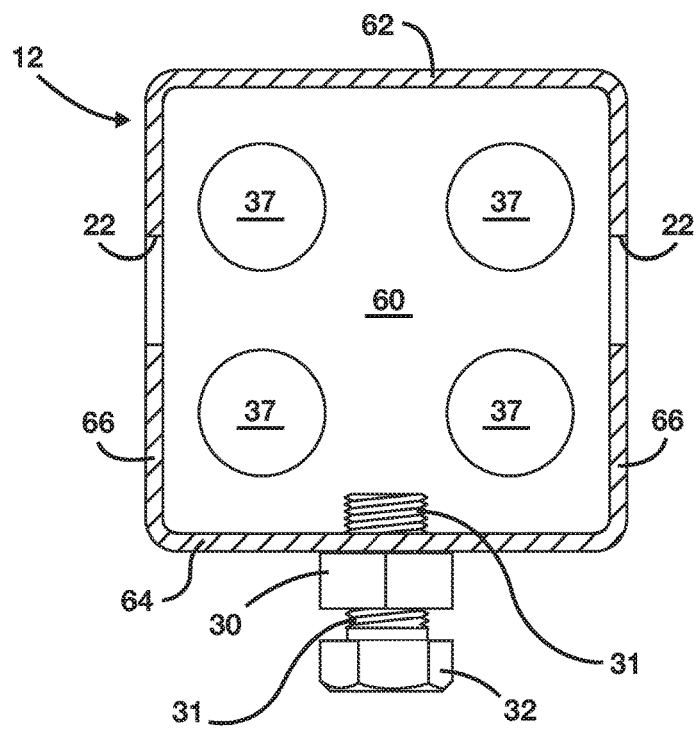
FIGS. 5 a rear elevation partial cross-sectional view of the receiver tube of FIG. 4, taken through line A-A shown in FIG. 3.

FIGS. 1-5 illustrate one embodiment of a receiver hitch assembly according to the present invention, generally designated as 10. The receiver hitch assembly 10 includes a ball mount 40 and a receiver 20 mounted to a vehicle 50. The receiver 20 includes a receiver tube 12 that has a forward end 13 and free rearward end 14 with an opening 18 for receiving a shank 21 of the ball mount 40. The ball mount 40 includes a hitch ball (not shown) with a threaded shank 42 that is removably mounted to the ball mount 40 with a hitch ball nut 44. The receiver tube 12 terminates at forward plate 60 that has holes 37, which allow air into the receiver tube 12 and allow fluids to drain from it. The receiver tube 12 also has a top wall 62, a bottom wall 64 and two opposing side walls 66, each of which has a side hole 22 for receiving a lateral hitch pin 26. The mount shank 21 also has side holes 23 for receiving the hitch pin 26. When the mount shank 21 is inserted into the receiver tube 12 so that the receiver side holes 22 align with the mount shank side holes 23, the hitch pin 26 can be inserted through the side holes 22, 23 to prevent the mount shank 21 from moving longitudinally within the receiver tube 12. The hitch pin 26 can be held in place by a hitch pin clip 34, as is known in the art, to prevent lateral forces from removing the hitch pin 26 from the side holes 22, 23.

Still referring to FIGS. 1-5, the receiver tube bottom wall 64 has an unthreaded pass-through bottom hole 24 positioned forward of the side holes 22. A locking nut 30 is fixedly mounted to the receiver tube 12 over the bottom hole 24, such as by welding, so that the threaded hole of the locking nut 30 aligns with the bottom hole 24. The locking nut 30 receives a clamping member in the form of a clamping screw or bolt 32 having a threaded shank 31. When the mount shank 21 is disposed in the receiver tube 12 with the hitch pin 26 inserted, the clamping bolt 32 can be tightened to advance it upward into contact with the mount shank 21 and thereby urge the mount shank forward end 52 upward into engagement with the upper interior surface 28 of the receiver tube 12. At the same time, the mount shank rearward end 54 is urged into engagement with the lower interior surface 29 of the receiver tube 12. The locking nut 30 prevents the clamping bolt 32 from backing out during towing. In this configuration, movement of the mount shank 21 within the receiver tube 12 is restricted during towing, thereby reducing the rattling noise associated with such movement.

Positioning the bottom hole 24 and clamping bolt 32 forward of the hitch pin 26 provides a number of advantages over prior art receiver hitch assemblies. When the clamping bolt 32 is tightened, it provides excellent frictional engagement between the mount shank 21 and the interior of the receiver tube 12 with only one clamping bolt. At the same time that the clamping bolt 32 presses the mount shank forward end 52 upward into frictional engagement with the receiver tube upper interior surface 28, it also exerts a downward force on the mount shank rearward end 54 to urge it into frictional engagement with the receiver tube lower interior surface 29 by utilizing the hitch pin 26 as a fulcrum. Also because of this configuration, the clamping bolt 32 exerts a load on the mount shank 21 that acts in the same direction as the load exerted by a trailer coupled to the ball mount 40 for towing (i.e., a downward load on the mount shank rearward end 54). Because this trailer load acts in the same direction as the clamping bolt load—rather than opposing the clamping bolt load—the assembly 10 requires only one clamping bolt to achieve frictional engagement suitable to restrict movement and eliminate rattling between the mount shank and the receiver tube during towing.

A user of the receiver hitch assembly 10 can simply and conveniently remove the ball mount shank 21 from the receiver tube 12 by loosening the clamping bolt 32. In some embodiments, the clamping bolt 32 can have a configuration selected to provide theft deterrence, such as a security screw or bolt that requires a special tool to be driven or removed from the threaded hole of the locking nut 30. Such a configuration can include, for example, a screw or bolt that utilizes a head design similar to those used for locking lug nuts or another tamper-proof head design, such a Torx® head, Torx® tamper proof head, locking head, allen head, spanner head, or the like.

From the foregoing, it can be seen that the apparatus of the present invention possesses numerous advantages. It provides an assembly of relative simple and economical construction that is cost-effective to manufacture and maintain, and yet it still can effectively eliminate rattling during towing. The location of the clamp bolt greatly simplifies the assembly as compared to other designs that use two or more set screws.

Upon reading this disclosure, additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept.

What is claimed is:

1. A receiver hitch comprising:
   a receiver tube having a forward end, a rearward end, a top wall, a bottom wall and two opposing side walls, wherein the receiver rearward end includes an opening sized for receiving a forward end of a mount shank and wherein the mount shank has a side hole sized for receiving a hitch pin;
   a receiver side hole disposed in the receiver tube side wall and sized for receiving the hitch pin;
   a receiver bottom hole disposed in the bottom wall of the receiver tube and sized for receiving a threaded clamping bolt, wherein the receiver bottom hole is disposed forward of the receiver side hole; and
   a threaded nut fixed to the receiver tube in alignment with the receiver bottom hole and sized for receiving a mating threaded portion of the clamping bolt;
   wherein when the mount shank is disposed in the receiver tube with the hitch pin inserted through the receiver side hole and the mount shank side hole, a portion of the mount shank forward of the hitch pin is urged into engagement with an upper interior surface of the receiver tube by advancing the clamping bolt in the threaded nut;
   whereby movement of the mount shank within the receiver tube is reduced.

2. The receiver hitch of claim 1 wherein the threaded nut comprises a locking nut.

3. The receiver hitch of claim 1 wherein the clamping bolt comprises a head configured for providing theft deterrence.

4. The receiver hitch of claim 1 wherein a portion of the mount shank rearward of the hitch pin is urged into engagement with a lower interior surface of the receiver tube by tightening the clamping bolt.

5. A receiver hitch comprising:
   a receiver tube comprising:
      a rearward opening for receiving a mount shank having a mount shank side hole sized for receiving a hitch pin;
      a receiver side hole sized for receiving the hitch pin; and
      a bottom hole disposed forward of the receiver side hole and sized for receiving an upwardly projecting clamping member; and
   means for adjustably advancing the clamping member upward into contact with mount shank when it is disposed in the receiver tube and the hitch pin is inserted through the receiver side hole and the mount shank side hole;
   wherein when the clamping member is advanced upward into contact with the mount shank, a portion of the mount shank forward of the receiver side hole is urged upward into engagement with an upper interior surface of the receiver tube;

whereby movement of the mount shank within the receiver tube is restricted.

6. The receiver hitch of claim 5 wherein when the clamping member is advanced upward into contact with the mount shank, a portion of the mount shank rearward of the receiver side hole is urged downward into engagement with a lower interior surface of the receiver tube.

7. The hitch of claim 5 wherein the means for adjustably advancing the clamping member upward comprises a threaded bolt.

8. The hitch of claim 5 wherein the means for adjustably advancing the clamping member upward comprises a threaded nut fixedly mounted to the bottom of the receiver.

9. The hitch of claim 7 wherein the threaded nut comprises a lock nut.

10. The hitch of claim 5 wherein the means for adjustably advancing the clamping member upward comprises a threaded portion formed in the receiver bottom hole and sized for receiving a mating portion of the threaded bolt.

11. The receiver hitch of claim 5 wherein the clamping member comprises a head configured for providing theft deterrence.

12. A receiver hitch comprising in combination:
- a receiver tube having a side hole sized for receiving a hitch pin and a threaded bottom hole disposed forward of the receiver side hole;
- a mount shank positioned within the receiver tube and having a rearward shank portion disposed rearward of the receiver side hole, a mount shank side hole aligned with the receiver side hole, and a forward shank portion disposed forward of the receiver side hole and over the threaded bottom hole;
- a hitch pin inserted through the aligned receiver side hole and through the mount shank side hole; and
- a clamping bolt sized for mating with the threaded bottom hole;
- wherein when the clamping bolt is rotated, it urges the forward shank portion upward against an upper interior surface of the receiver tube;
- whereby movement of the mount shank within the receiver tube is reduced.

13. The receiver hitch of claim 12 wherein when the clamp bolt is rotated, it urges the rearward shank portion downward against a lower interior surface of the receiver tube.

14. The receiver hitch of claim 12, wherein the threaded bottom hole is formed, at least in part, by a threaded locking nut fixedly mounted to the bottom of the receiver tube.

15. The receiver hitch of claim 12 wherein the clamping bolt comprises a head configured for providing theft deterrence.

* * * * *